US010974626B2

(12) United States Patent
Yilma et al.

(10) Patent No.: US 10,974,626 B2
(45) Date of Patent: Apr. 13, 2021

(54) SEAT ASSEMBLY WITH INTEGRATED BELT MEMBER

(71) Applicant: Ford Global Technologies, LLC, Dearborn, MI (US)

(72) Inventors: Benjamin Yilma, Canton, MI (US); Spencer Robert Hoernke, Dundas (CA); Marcos Silva Kondrad, Macomb Township, MI (US); Johnathan Andrew Line, Northville, MI (US); Sean Bayle West, Monroe, MI (US); Edward Joseph DeSmet, Canton, MI (US); William Jerome Olsen, Farmington Hills, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 16/568,324

(22) Filed: Sep. 12, 2019

(65) Prior Publication Data

US 2021/0078468 A1    Mar. 18, 2021

(51) Int. Cl.
*B60N 2/427*     (2006.01)
*B60R 21/18*     (2006.01)
*B60R 22/28*     (2006.01)

(52) U.S. Cl.
CPC .......... *B60N 2/42718* (2013.01); *B60R 21/18* (2013.01); *B60R 22/28* (2013.01)

(58) Field of Classification Search
CPC .. B60N 2/42718; B60N 2/4263; B60R 22/28; B60R 21/16; B60R 21/18

USPC ...................................... 297/481, 470, 216.1
See application file for complete search history.

(56) References Cited

U.S. PATENT DOCUMENTS

| 3,591,232 | A | * | 7/1971 | Simon ..................... B60R 21/02 297/216.1 |
| 5,456,491 | A | | 10/1995 | Chen et al. |
| 5,704,638 | A | | 1/1998 | Lane, Jr. |
| 6,079,745 | A | | 6/2000 | Wier |

(Continued)

FOREIGN PATENT DOCUMENTS

| CN | 104648194 | 10/2017 |
| KR | 20030039320 A | 5/2003 |
| KR | 100570356 B1 | 4/2006 |

*Primary Examiner* — Milton Nelson, Jr.
(74) *Attorney, Agent, or Firm* — David Copiellie; Price Heneveld LLP

(57) ABSTRACT

A seat assembly includes a seatback having an interior portion and a seat portion having an interior portion. A belt member includes first and second ends and a deployable portion disposed therebetween. The deployable portion is operable between a stowed position and a deployed position. The deployable portion of the belt member is disposed within the interior portion of the seatback and the interior portion of the seat portion when the deployable portion is in the stowed position. The deployable portion of the belt member is disposed outside of the interior portion of the seatback and outside of the interior portion of the seat portion when the deployable portion is in the deployed position. One or more retractor mechanisms are operably coupled to the belt member and operative to retract a portion of the deployable portion of the belt member after or during deployment.

13 Claims, 12 Drawing Sheets

(56) References Cited

U.S. PATENT DOCUMENTS

| | | | |
|---|---|---|---|
| 6,375,270 B1 * | 4/2002 | Sullivan | B60R 22/26 297/484 |
| 6,450,573 B1 * | 9/2002 | Yamaguchi | B60N 2/4221 297/216.1 |
| 6,773,075 B2 * | 8/2004 | Rouhana | B60R 22/26 242/378.4 |
| 7,607,687 B2 | 10/2009 | Clute et al. | |
| 7,976,066 B2 | 7/2011 | Bok et al. | |
| 8,672,347 B2 | 3/2014 | Schneider et al. | |
| 9,114,780 B2 | 8/2015 | Fischer et al. | |
| 9,199,560 B2 | 12/2015 | Line et al. | |
| 2009/0309397 A1 | 12/2009 | Gross et al. | |
| 2011/0121620 A1 | 5/2011 | Masutani | |
| 2018/0022244 A1 | 1/2018 | Duncan et al. | |

\* cited by examiner

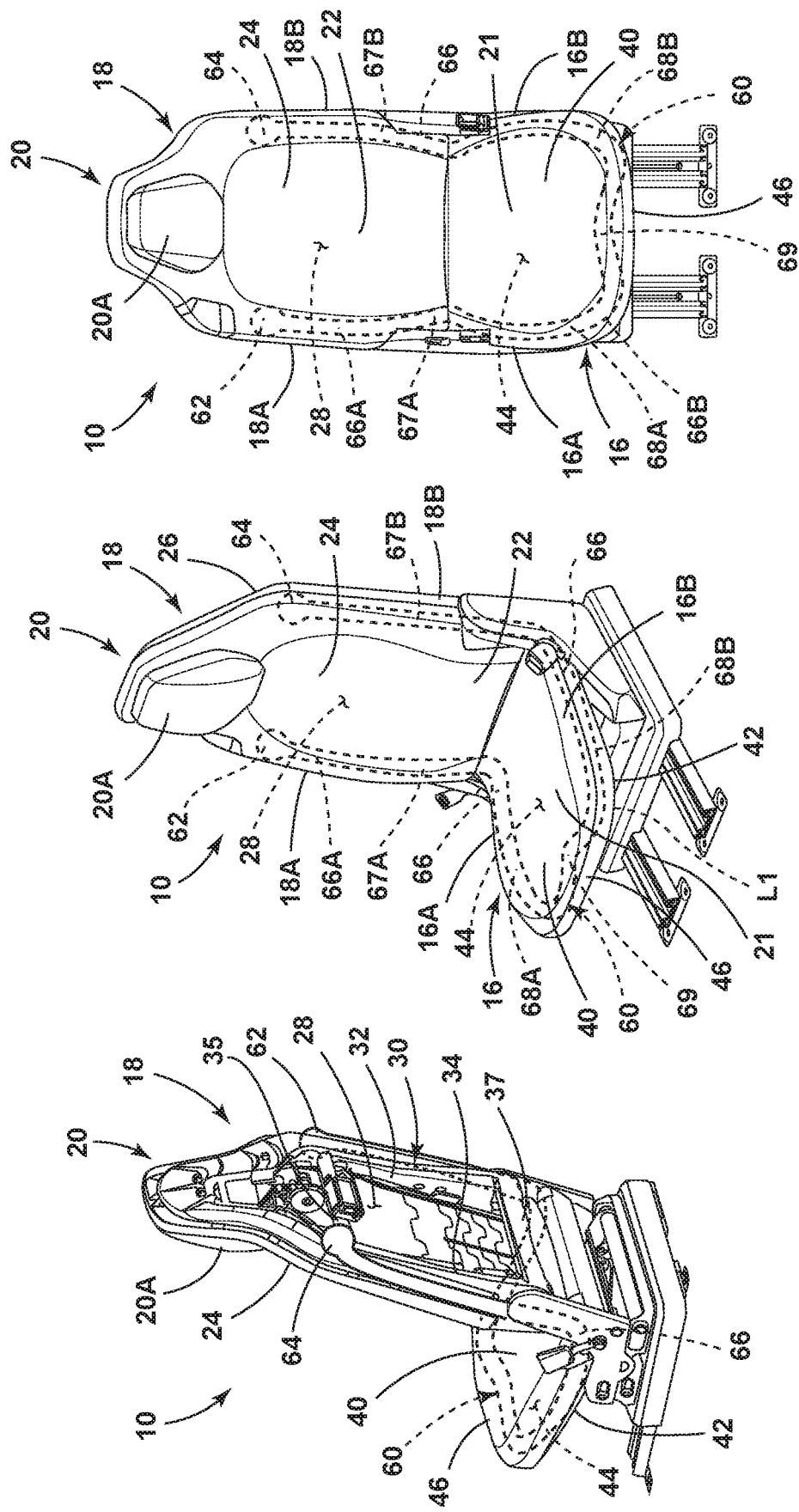

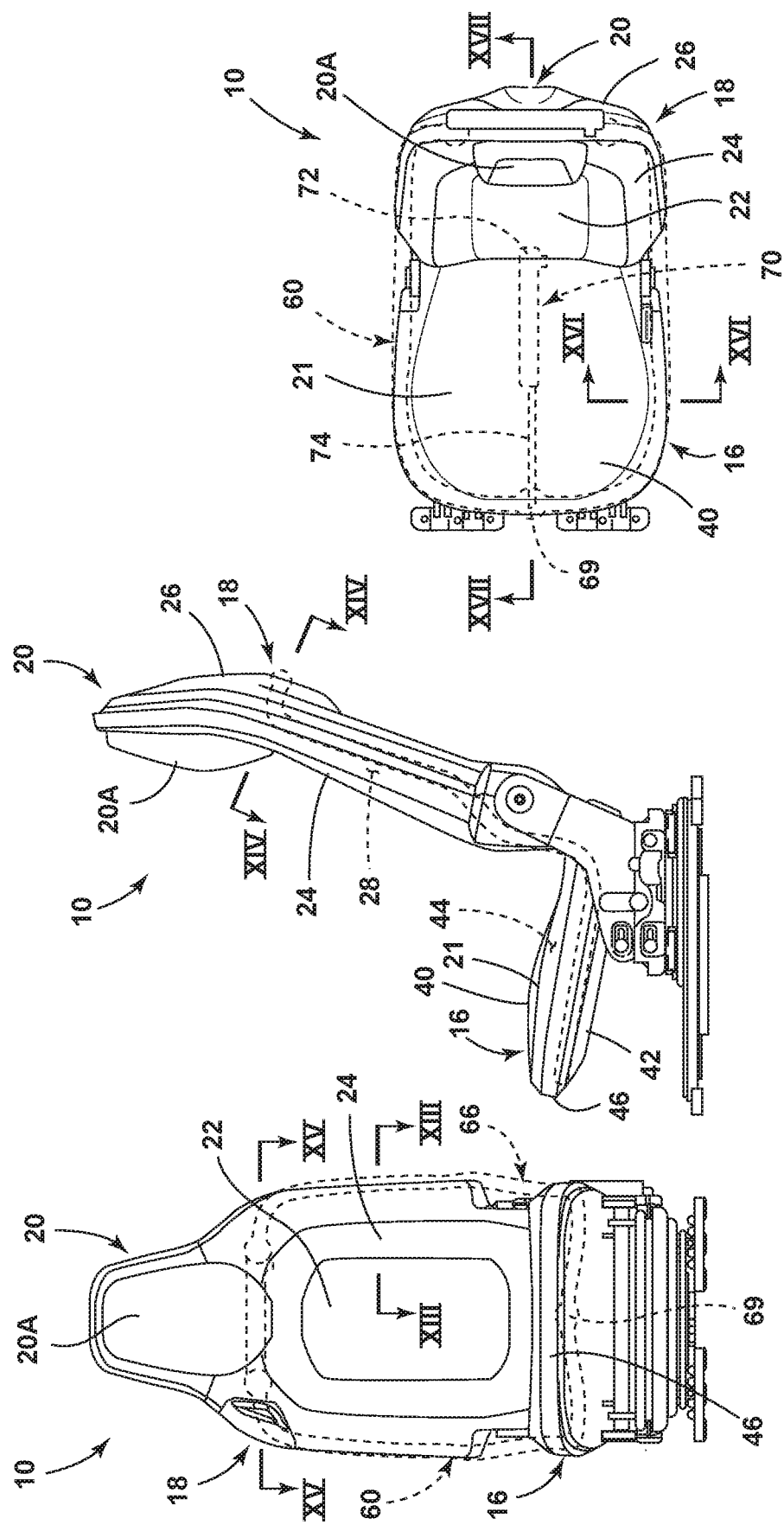

SEAT ASSEMBLY WITH INTEGRATED BELT MEMBER

FIELD OF THE INVENTION

The present invention generally relates to a seat assembly, and more particularly, to a seat assembly having a belt member having a deployable portion that is provided for seat occupant position management.

BACKGROUND OF THE INVENTION

Seat occupant position management features are desired for a seat sub-assembly as packaged within a seat assembly. A belt member having a deployable portion that can be selectively deployed from the seat assembly is desired for guiding seat occupant positioning.

SUMMARY OF THE INVENTION

According to one aspect of the present invention, a seat assembly includes a seatback including opposed first and second sides and an interior portion. A seat portion includes opposed first and second sides, as well as a front portion and an interior portion. A belt member includes first and second ends and a deployable portion. The deployable portion of the belt member is operable between stowed and deployed positions. The deployable portion of the belt member is disposed within the interior portion of the seatback and the interior portion of the seat portion in the stowed position. The deployable portion of the belt member is disposed outside of the interior portion of the seatback and outside of the interior portion of the seat portion in the deployed position.

According to another aspect of the present invention, a seat assembly includes a seatback including an interior portion. A seatback frame is disposed within the interior portion of the seatback. A seat portion includes an interior portion. A belt member includes first and second ends and a deployable portion. The deployable portion of the belt member includes first and second portions and is operable between stowed and deployed positions. The first portion of the deployable portion is disposed within the interior portion of the seatback when the deployable portion is in the stowed position. The second portion of the deployable portion is disposed within the interior portion of the seat portion when the deployable portion is in the stowed position. The first and second portions of the deployable portion of the belt member are disposed outside of the interior portion of the seatback and outside of the interior portion of the seat portion when the deployable portion is in the deployed position.

According to yet another aspect of the present invention, a seat assembly includes a seatback including an interior portion. A seat portion includes an interior portion and a front portion. A belt member includes first and second ends and a deployable portion disposed therebetween. The deployable portion is operable between a stowed position and a deployed position. The deployable portion is disposed within the interior portion of the seatback and the interior portion of the seat portion when the deployable portion is in the stowed position. The deployable portion of the belt member is disposed outside of the interior portion of the seatback and outside of the interior portion of the seat portion when the deployable portion is in the deployed position. A retractor mechanism is operably coupled to the belt member and operative to retract a portion of the deployable portion of the belt member.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a rear perspective view of the seat assembly of FIG. 2 with a rear carrier module removed therefrom to reveal a seatback frame coupled to a belt member;

FIG. 4 is a front perspective view of the seat assembly of FIG. 2 with a belt member shown in phantom in a stowed position;

FIG. 5 is a top plan view of the seat assembly of FIG. 4;

FIG. 10 is a front elevation view of the seat assembly of FIG. 4;

FIG. 11 is a side elevation view of the seat assembly of FIG. 10;

FIG. 12 is a top plan view of the seat assembly of FIG. 10;

DETAILED DESCRIPTION OF THE PREFERRED EMBODIMENTS

Figure 1:
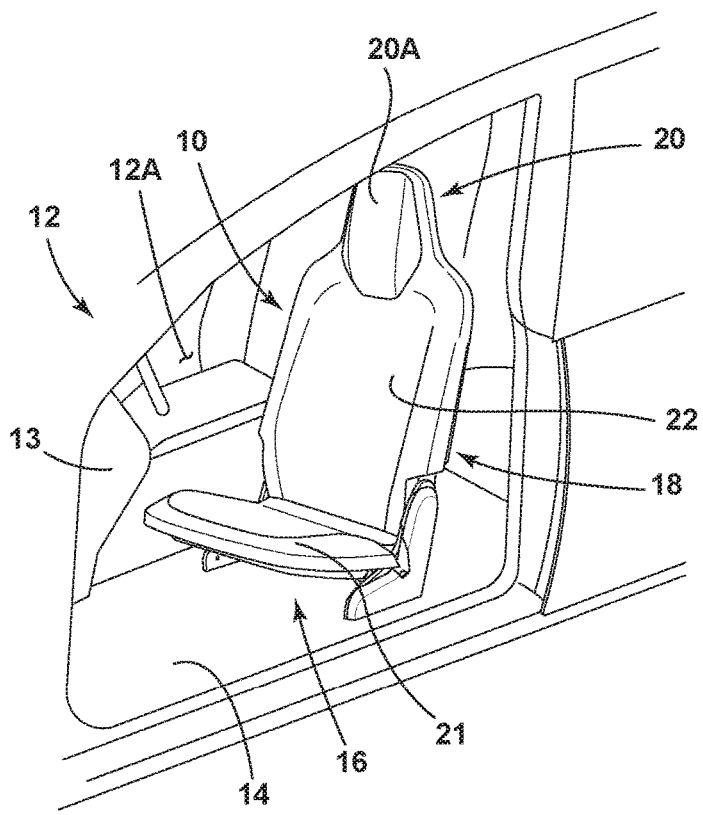
FIG. 1 is a front perspective view of a seat assembly positioned within a vehicle interior.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area in a forward-facing configuration. However, it is contemplated that the seat assembly 10, or various components and features thereof, can be disposed on other seat assemblies positioned in other areas of a vehicle interior 12A, such as the passenger side seating area, a rear seating area, or a third row seating option for example. The seat assembly 10 is shown in FIG. 1 as being supported on a vehicle floor support surface 14 and generally includes a substantially horizontal seat portion 16 and a substantially upright seatback 18. It is contemplated that the seat assembly 10 may be configured to rotate within the vehicle interior 12A between forward-facing and rearward-facing configurations, and all other rotational angles therebetween. As such, it is contemplated that the vehicle 12 may be an autonomous or self-driving vehicle, in which a seat assembly having forward-facing and rearward-facing capabilities could be used.

Figure 2:
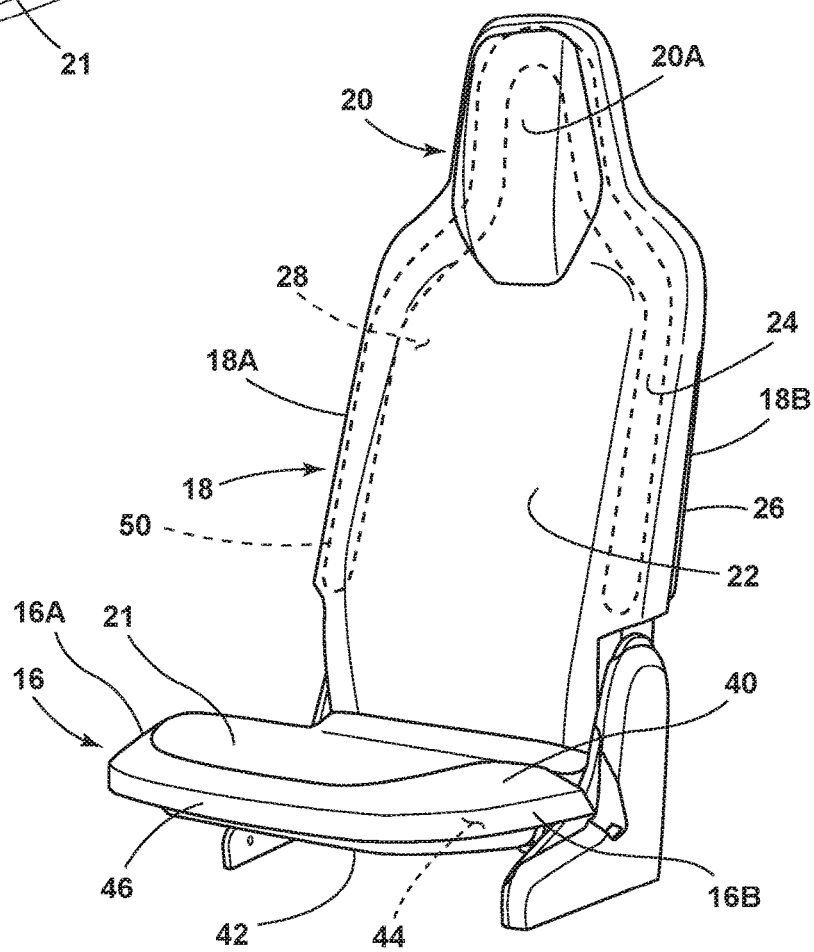
FIG. 2 is a front perspective view of the seat assembly of FIG. 1 as removed from the vehicle and showing an overhead airbag assembly in phantom in a stowed position.

As shown in FIGS. 1 and 2, a headrest assembly 20 is disposed on an upper portion of the seatback 18 and includes a forwardly extending headrest bun 20A. The headrest assembly 20 and the seatback 18 may be integrated components or modular components coupled to one another. As further shown in FIG. 1, the seat portion 16 includes an upper support surface 21 configured to support a seat occupant thereon. Further, the seatback 18 includes a back support portion 22 that is centrally disposed on the seatback 18.

With specific reference to FIG. 2, the back support portion 22 is contemplated to include various support materials, such as cloth and foam materials, packaged on an exterior comfort carrier module, or front carrier module 24, to support the back of a seat occupant seated on the seat assembly 10. The seatback 18 includes opposed sides 18A, 18B that are spaced-apart from one another. As further shown in FIG. 2, the headrest assembly 20 is disposed above the back support portion 22 of the seatback 18 and may be an integrated feature of the front carrier module 24. In assembly, the front carrier module 24 is coupled to a rear carrier module 26 around a seatback frame 30 (FIG. 3) in a partially detachable or releasable manner, as further described below. The coupling of the front carrier module 24 and the rear carrier module 26 defines an interior portion 28 of the seatback 18 disposed between the front carrier module 24 and the rear carrier module 26. The seatback frame 30 (FIG. 3) is disposed within the interior portion 28 of the seatback 18 in assembly. The rear carrier module 26 may be provided in the form of a rear closeout panel for the seatback 18.

With further reference to FIG. 2, the upper support surface 21 is contemplated to include various support materials, such as cloth and foam materials, packaged on an exterior comfort carrier module, or upper carrier module 40, to support the a seat occupant seated on the seat portion 16 of the seat assembly 10. As further shown in FIG. 2, a panel 42 is provided as a close out panel that is coupled to the upper carrier module 40. The seat portion 16 includes an interior portion 44. With regards to the seat portion 16, the term "interior portion" is meant to describe a portion covered by the upper carrier module 40. The interior portion 44 may also refer to an enclosed space that is defined between the upper carrier module 40 and the panel 42 of the seat portion 16, as coupled to one another. As further shown in FIG. 2, the seat portion 16 includes a front portion 46 which may include a displaceable plate, as further described below. The seat portion 16 further includes opposed sides 16A, 16B that are spaced-apart from one another.

Figure 7:
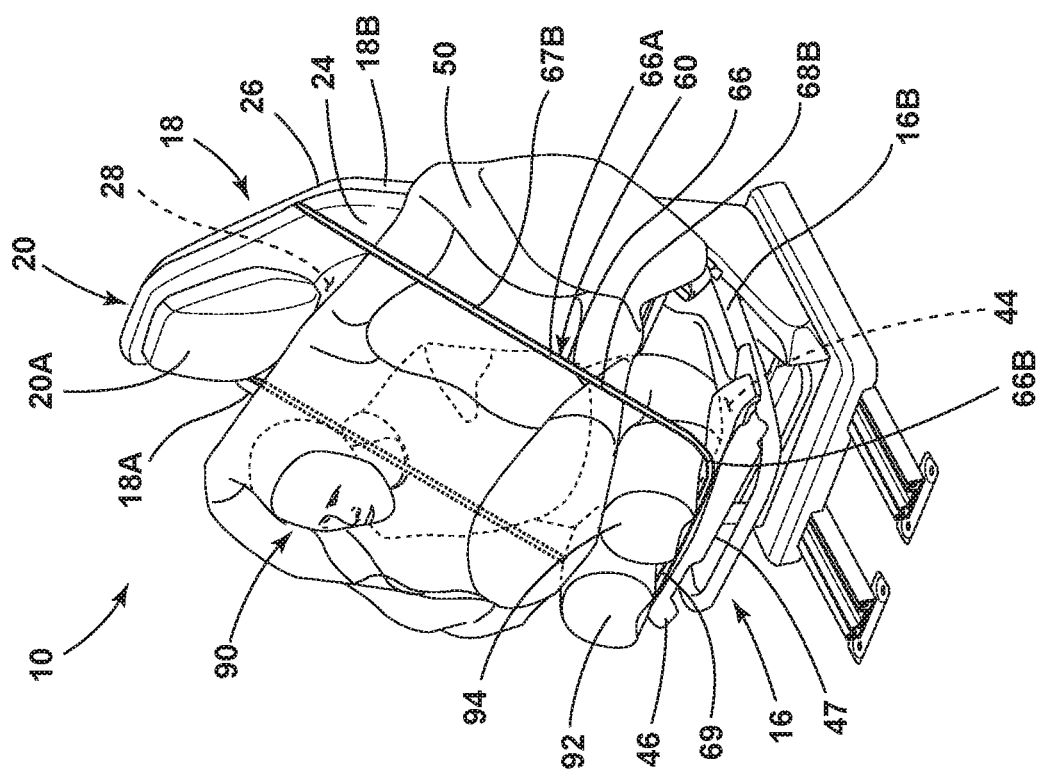
FIG. 7 is a front perspective view of the seat assembly of FIG. 6 with a seat occupant shown surrounded by an airbag assembly with the belt member disposed around the seat occupant and further showing displaceable platform of the seat assembly in an actuated position.
Figure 8:
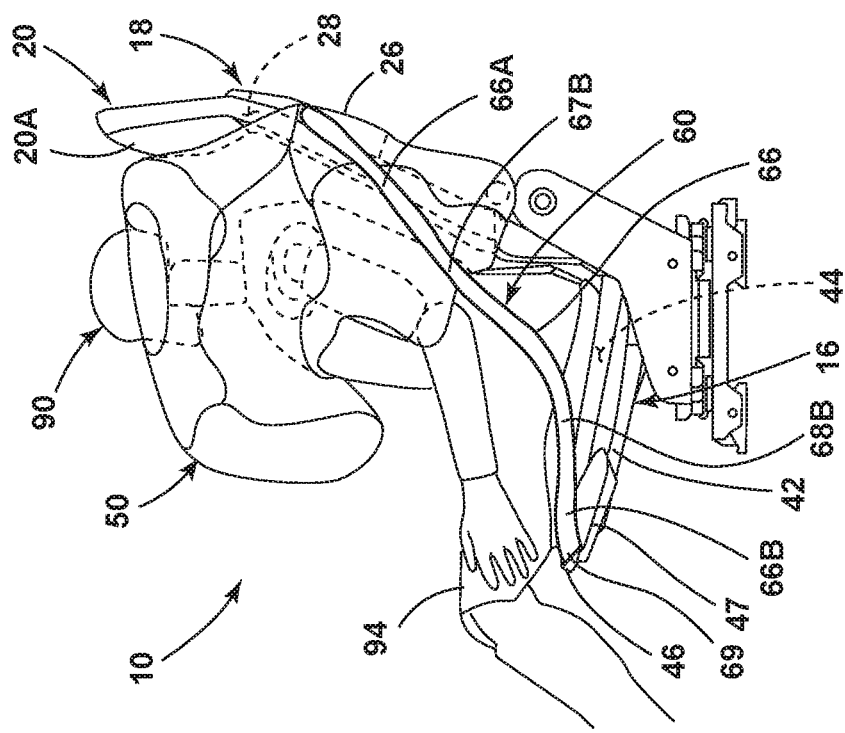
FIG. 8 is a side elevation view of the seat assembly of FIG. 4 with a seat occupant positioned in the seat assembly and the belt member and airbag assembly in deployed positions.

As further shown in FIG. 2, the seat assembly 10 includes an airbag assembly 50 disposed within the interior portion 28 of the seatback 18. The airbag assembly 50 is operable between deployed and stowed positions. In FIG. 2, the airbag assembly 50 is shown in the stowed position, in which the airbag assembly 50 is supported and contained within the interior portion 28 of the seatback 18. The airbag assembly 50 is configured to deploy from the stowed position to a deployed position in a seat-forward direction around the back support portion 22 of the seatback 18, as shown in FIGS. 7 and 8. The airbag assembly 50 is disposed along the opposed sides 18A, 18B of the seatback 18 and is further disposed around an outer perimeter of the headrest assembly 20 of the seatback 18 in the stowed position. In this way, the airbag assembly 50 is an overhead airbag assembly that is configured to outwardly deploy to surround a seat occupant, much like the airbag assemblies disclosed in U.S. patent application Ser. Nos. 16/370,617 and 16/370,519 entitled SEAT ASSEMBLY WITH FULL SEATBACK AIRBAG filed Mar. 29, 2019, which are hereby incorporated by reference in their entireties.

Referring now to FIG. 3, the seat assembly 10 is shown with the rear carrier module 26 removed from the seatback 18 to reveal a seatback frame 30 disposed within the interior portion 28 of the seatback 18. The seatback frame 30 is shown having first and second side members 32, 34 which are generally disposed in an upright orientation and opposed to one another in a spaced-apart relationship. The first and second side members 32, 34 are interconnected by an upper cross-member 35 and a lower cross member 37 and are contemplated to be mirror images of one another. Thus, the description of one side member also describes the other side member in a mirrored configuration. In use, the seatback frame 30 is provided to rigidly support a seat occupant. Further, the seatback frame 30 provides a support structure for anchoring a belt member and one or more retractor mechanisms, as further described below.

With further reference to FIG. 3 and FIGS. 4-5, a belt member 60 is shown operably coupled to and disposed within the seat assembly 10. The belt member 60 includes a deployable portion 66 that is operable between stowed and deployed positions. In FIGS. 3-5, the deployable portion 66 of the belt member 60 is shown in the stowed position. With the deployable portion 66 of the belt member 60 in the stowed position, the belt member 60 is received and concealed within the interior portion 28 of the seatback 18 and the interior portion 44 of the seat portion 16 of the seat assembly 10. With specific reference to FIGS. 4 and 5, the deployable portion 66 of the belt member 60 includes a first portion 66A and a second portion 66B. The first portion 66A of the deployable portion 66 of the belt member 60 is comprised of first and second sections 67A and 67B which extend downwardly from the first and second ends 62, 64, respectively, when the deployable portion 66 is in the stowed position. With the deployable portion 66 in the stowed position, the first portion 66A of the deployable portion 66 is disposed within the interior portion 28 of the seatback 18. Thus, as shown in FIGS. 4 and 5, the first and second sections 67A and 67B are disposed within the interior portion 28 of the seatback 18 along the opposed sides 18A, 18B thereof. Similarly, the second portion 66B of the deployable portion 66 includes first and second sections 68A, 68B. With the deployable portion 66 in the stowed position, the second portion 66B of the deployable portion 66 is disposed within the interior portion 44 of the seat portion 16. Thus, as shown in FIGS. 4 and 5, the first and second sections 68A and 68B are disposed within the interior portion 44 of the seat portion 16 along the opposed sides 16A, 16B thereof. The first and second sections 68A and 68B meet around the front portion 46 of the seat portion 16 at an intermediate portion 69. The intermediate portion 69 may be anchored to the front portion 46 of the seat portion 16, or may be anchored to a retractor mechanism, as further described below. With specific reference to FIG. 4, the deployable portion 66 of the belt member 60 includes a length L1 when the deployable portion 66 is in the stowed position.

With further reference to FIG. 3, the first end 62 of the belt member 60 is shown coupled to the first side member 32 of the seatback frame 30. As further shown in FIG. 3, the second end 64 of the belt member 60 is shown coupled to the second side member 34 of the seatback frame 30. Thus, in the embodiment of FIG. 3, the first and second ends 62, 64 of the belt member 60 are operably coupled to the seatback frame 30 at opposed sides 18A, 18B of the seatback 18. The belt member 60 can also be coupled to the seatback frame 30 through a retractor mechanism, thereby providing a dynamic coupling of the belt member 60 to the seatback frame 30, as further described below.

Figure 6:
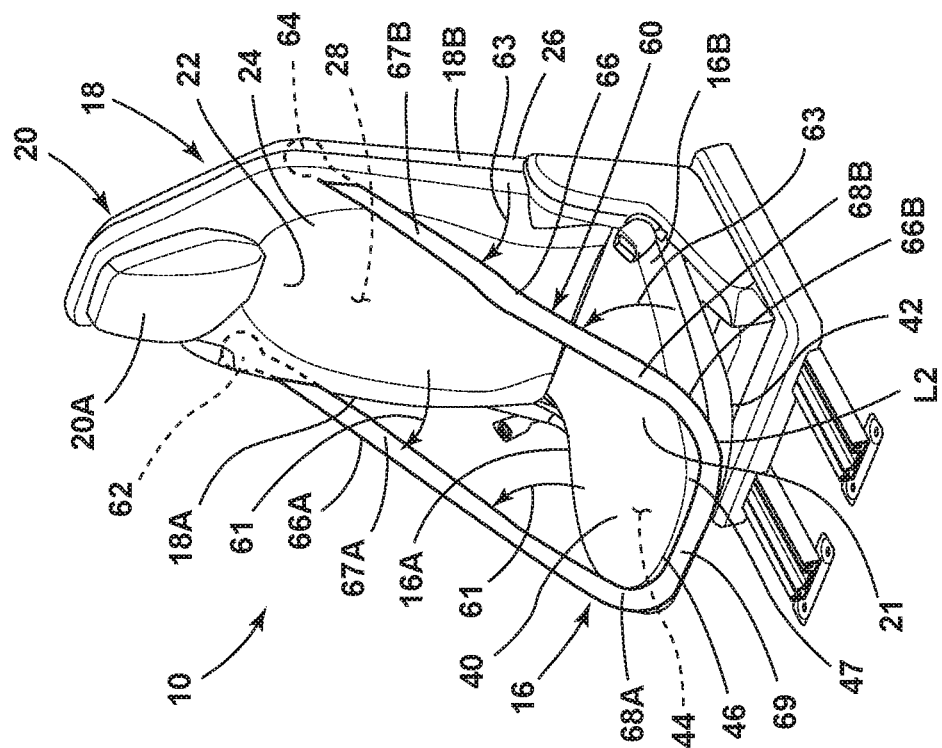
FIG. 6 is a front perspective view of the seat assembly of FIG. 4 with the belt member shown in a deployed position.

Referring now to FIG. 6, the deployable portion 66 of the belt member 60 is shown in a deployed position. With the deployable portion 66 of the belt member 60 in the deployed position, the first and second portions 66A, 66B of the deployable portion 66 of the belt member 60 are disposed outside of the interior portion 28 of the seatback 18 and outside of the interior portion 44 of the seat portion 16, respectively. Specifically, with the deployable portion 66 of the belt member 60 in the deployed position, the first and second sections 67A, 67B of the first portion 66A of the deployable portion 66 of the belt member 60 are disposed outside of the interior portion 28 of the seatback 18. Further, with the deployable portion 66 of the belt member 60 in the deployed position, the first and second sections 68A, 68B of the second portion 66B of the deployable portion 66 of the belt member 60 are disposed outside of the interior portion 44 of the seat portion 16, respectively. Thus, the deployable portion 66 of the belt member 60 is described as the portions of the belt member 60 that emerge from the interior portions 28, 44 of the seat assembly 10.

With reference to FIGS. 4 and 6, the deployable portion 66 of the belt member 60 includes a length L2 (FIG. 6) when deployed. The length L2 of the deployable portion 66 of the belt member 60 is less than the length L1 (FIG. 4) of the deployable portion 66 when the deployable portion 66 is in the stowed position. This is generally due to the sections 67A, 67B, 68A, 68B of the deployable portion 66 of the belt member 60 following the contours of the generally upright seatback 18 and the substantially horizontal seat portion 16. As such, in the deployed position, the deployable portion 66 of the belt member 60 forms the equivalent of a hypotenuse relative to the sections 67A, 67B, 68A, 68B of the deployable portion 66 of the belt member 60 in the stowed position. In FIG. 6, the deployment of the deployable portion 66 of the belt member 60 is shown via arrows 61, 63 along the opposed sides 18A, 18B of the seatback 18 and along the opposed sides 16A, 16B of the seat portion 16. It is contemplated that the first portion 66A of the deployable portion 66 of the belt member 60 will deploy through a releasable portion of the coupling between the front carrier module 24 and the rear carrier module 26 of the seatback 18. Further, it is contemplated that the second portion 66B of the deployable portion 66 of the belt member 60 will deploy through a releasable portion of the coupling between the upper carrier module 40 and the panel 42 of the seat portion 16.

Referring now to FIG. 7, the seat assembly 10 is shown with a seat occupant 90 supported thereon. In the embodiment shown in FIG. 7, the airbag assembly 50 has been deployed from the interior portion 28 of the seatback 18 to surround the arms, torso and head portion of the seat occupant 90. Along with the airbag assembly 50, the deployable portion 66 of the belt member 60 has also been deployed from the interior portions 28, 44 of the seatback 18 and the seat portion 16, respectively, such that the deployable portion 66 of the belt member 60 are now disposed outside of the respective interior portions 28, 44. In FIG. 7, the intermediate portion 69 of the belt member 60 is shown disposed under the thighs 92, 94 of the seat occupant 90. As further described below, the belt member 60 is configured to retract, such that the seat occupant 90 is cradled in a swing like manner by the belt member 60 when the deployable portion 66 of the belt member 60 is deployed and retracted. In this way, the belt member 60 is contemplated to manage and reduce seat occupant forward motion during a dynamic event.

As further shown in FIG. 7, the front portion 46 of the seat portion 16 includes a displaceable platform 47 which is operable between a first position (FIG. 6) and a second position (FIG. 7), wherein the second position is upwardly angled relative to the first position. Thus, the displaceable platform 47 of the seat portion 16 also acts to reduce seat occupant forward motion during a dynamic event. It is contemplated that the displaceable platform 47 pivots between the first and second positions during deployment of the belt member 60.

Referring now to FIG. 8, the airbag assembly 50 is shown being deployed along with the belt member 60. As initially deployed, the deployable portion 66 of the belt member 60 may include an amount of slack that is associated with the deployable portion 66 of the belt member 60 being in the stowed position at a length L1 (FIG. 4). Thus, it is contemplated that the deployable portion 66 of the belt member 60 can be retracted to tighten the belt member 60 by retracting a portion of the deployable portion 66. Such retraction is contemplated to be provided using one or more retractor mechanisms.

Figure 9:
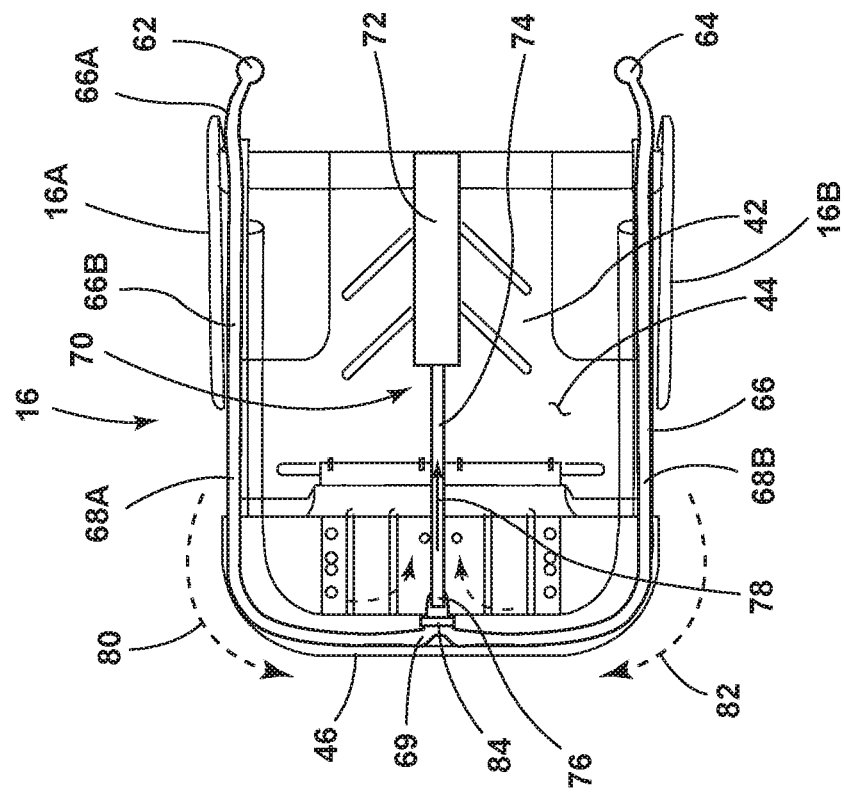
FIG. 9 is a top plan view of a seat portion having an upper carrier module removed therefrom to reveal a retractor mechanism operably coupled to a belt member.

Referring now to FIG. 9, upper carrier module 40 of the seat portion 16 has been removed to reveal a coupling between the intermediate portion 69 of the belt member 60 and a retractor mechanism 70. The retractor mechanism 70 is provided to retract a portion of the deployable portion 66 of the belt member 60 during or after the deployable portion 66 of the belt member 60 is deployed. The retractor mechanism 70 is contemplated to be positioned within the interior portion 44 of the seat portion 16 and is therefore concealed by the upper carrier module 40 in assembly. The retractor mechanism 70 is contemplated to be operably coupled to the seat portion 16 at a mounting portion 72 of the retractor mechanism 70. The retractor mechanism 70 further includes a retractable member 74 operable between extended and retracted positions relative to the mounting portion 72. The retractable member 74 may inwardly retract using a pyro retraction mechanism for efficient retraction. In FIG. 9, the intermediate portion 69 of the belt member 60 is operably coupled to the retractable member 74 of the retractor mechanism 70 at an engagement end 76 thereof. The retractable member 74 is configured to inwardly retract along the path as indicated by arrow 78 to retract the belt member 60 by inwardly displacing the intermediate portion 69 of the belt member 60 relative to the front portion 46 of the seat portion 16. In this way, the retractor mechanism 70 can retract a portion of the first and second sections 68A, 68B of the second portion 66B of the deployable portion 66 of the belt member 60 as indicated by arrows 80, 82, respectively. In this way, in the embodiment of FIG. 9, the intermediate portion 69 of the belt member 60 is operably coupled to the front portion 46 of the seat portion 16 at the retractor mechanism 70 thereof. It is further contemplated that a guide member 84 may also be operably coupled to the front portion 46 of the seat portion 16 to guide the retraction of the first and second sections 68A, 68B of the second portion 66B of the deployable portion 66 of the belt member 60. Retraction of the belt member 60 is configured to move the belt member 60 from the slack condition shown in FIG. 8 to the taught condition shown in FIG. 7. Again, the belt member 60 is engaged with a seat occupant 90 when the deployable portion 66 of the belt member 60 is in the deployed position and retracted condition. This deployed position and retracted condition of the deployable portion 66 of the belt member 60 provides for the decreased length L2 (FIG. 7) as compared to the length L1 of the belt member 60 shown in FIG. 4. It is contemplated that the retractor mechanism 70 may be a slider mechanism integrated into the seat portion 16 that uses an explosive retracting technique to quickly retract the belt member 60 by moving laterally between first and second positions. It is contemplated that all types of retractor mechanisms or pretensioners may be used interchangeably at the various positions shown in the provided drawings, as well as other suitable positions disposed on the seat assembly 10. The retractor mechanism 70 may also include a load-limit pyro-spool retractor mechanism for spooling up slack portions of the webbing of the belt member 60.

Referring now to FIGS. 10-12, the seat assembly 10 is shown in various configurations with associated markings for cross-sectional figures discussed below.

Figure 13B:
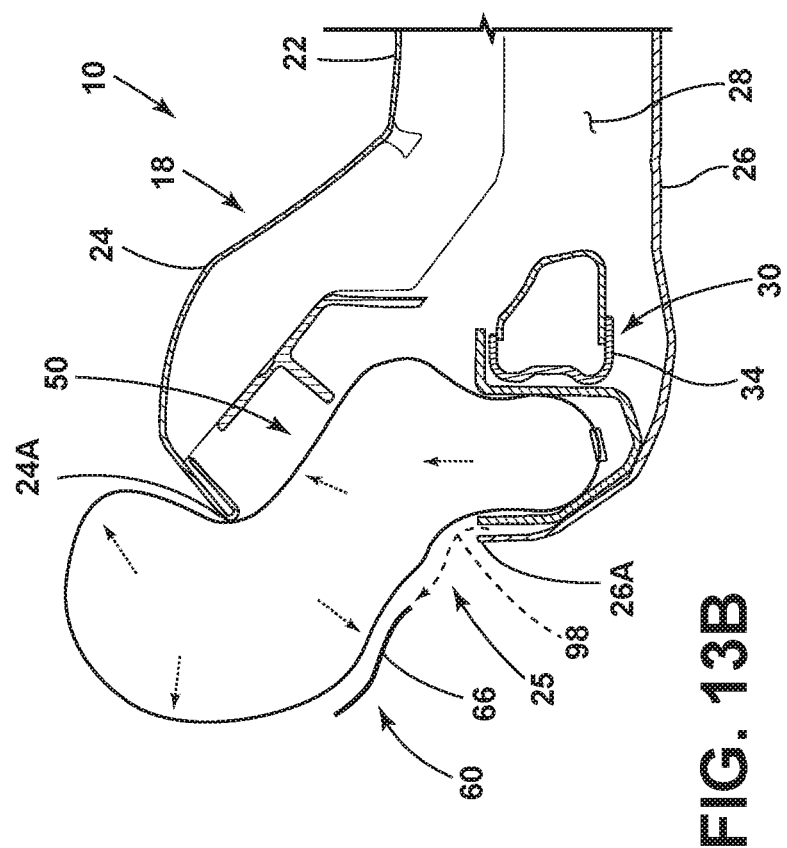
FIG. 13B is a fragmentary cross-sectional view of the seat assembly of FIG. 10 taken at line XIII showing a belt member and an airbag assembly in partially deployed positions.
Figure 13A:
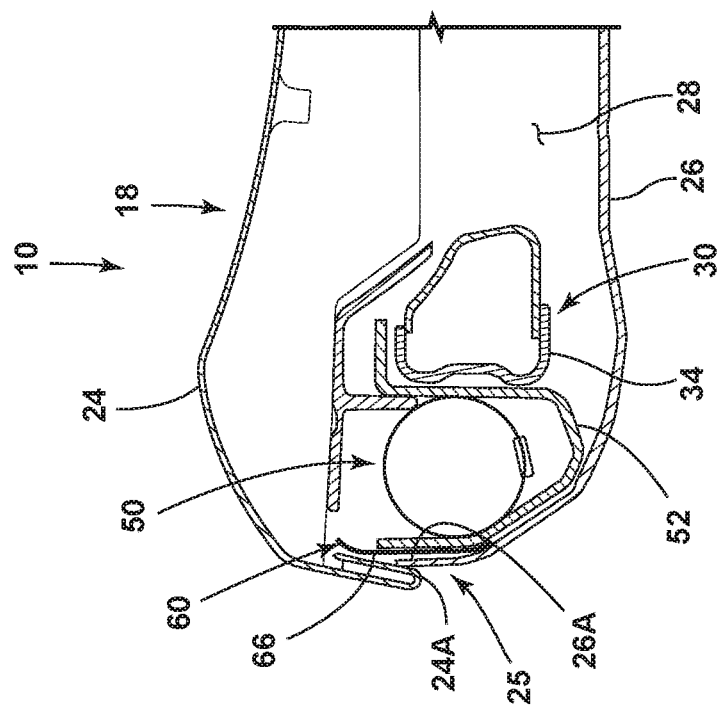
FIG. 13A is a fragmentary cross-sectional view of the seat assembly of FIG. 10 taken at line XIII showing a belt member and an airbag assembly in stowed positions.

Referring now to FIG. 13A, the seat assembly 10 is shown in a cross-sectional view with the airbag assembly 50 and the belt member 60 shown in stowed positions within the interior portion 28 of the seatback 18. As shown, the airbag assembly 50 is supported in an airbag carrier module 52 that is operably coupled to the seatback frame 30 at second side member 34. The airbag carrier module 52 is contemplated to be further coupled to the seatback frame 30 at the first side member 32. The belt member 60 is shown positioned outside of the airbag carrier module 52 and adjacent a seam 25 disposed between inside edges 24A, 26A of the front carrier module 24 and the rear carrier module 26, respectively. The seam 25 is contemplated to be part of a releasable coupling between the front carrier module 24 and the rear carrier module 26, through which the airbag assembly 50 and the belt member 60 can deploy. In the embodiment shown in FIG. 13A, the airbag assembly 50 and the belt member 60 are packaged and concealed within the interior portion 28 of the seatback 18 between the front carrier module 24 and the rear carrier module 26.

Referring now to FIG. 13B, the airbag assembly 50 is shown in a partially inflated condition having deployed through the seam 25 disposed between inside edges 24A, 26A of the front carrier module 24 and the rear carrier module 26, respectively. Thus, the airbag assembly 50 has moved from the stowed position towards a deployed position, and is shown in FIG. 13B with inner arrows illustrating inflation forces within the airbag assembly 50. With the airbag assembly 50 deployed from the seatback 18, the deployable portion 66 of the belt member 60 has also moved from the stowed position shown in FIG. 13A, towards the deployed position in a forward and outward direction as indicated by arrow 98. Thus, it is contemplated that the deploying movement of the airbag assembly 50 has caused the front carrier module 24 to release from its coupling with the rear carrier module 26 at the seam 25, such that both the airbag assembly 50 and the deployable portion 66 of the belt member 60 can exit the interior portion 28 of the seatback 18. Thus, the deployable portion 66 of the belt member 60 is provided outside of the interior portion 28 of the seatback 18 in the deployed position shown in FIG. 13B.

Figure 14B:
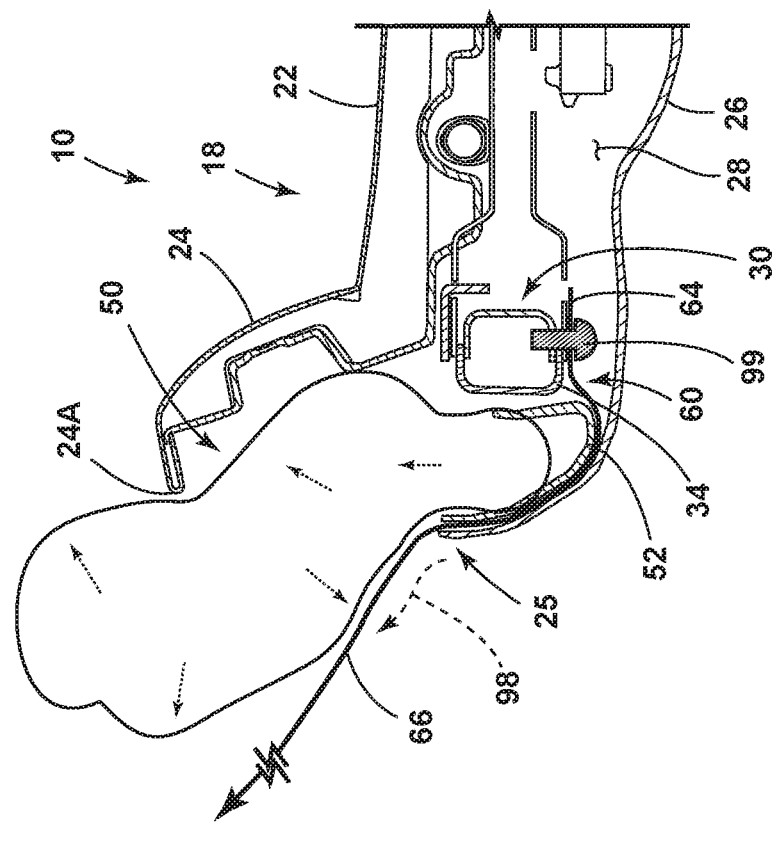
FIG. 14B is a fragmentary cross-sectional view of the seat assembly of FIG. 11 taken at line XIV showing a belt member and an airbag assembly in partially deployed positions.
Figure 14A:
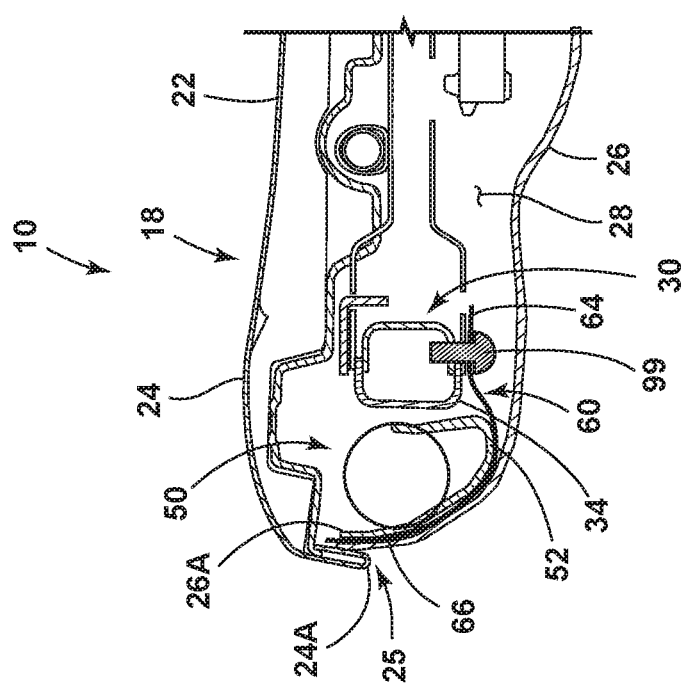
FIG. 14A is a fragmentary cross-sectional view of the seat assembly of FIG. 11 taken at line XIV showing a belt member anchored to a seatback frame and an airbag assembly in a stowed position.

Referring now to FIG. 14A, the seat assembly 10 is shown in a cross-sectional view with the airbag assembly 50 and the belt member 60 shown in stowed positions within the interior portion 28 of the seatback 18. As shown in FIG. 14A, the second end 64 of the belt member 60 is coupled to the second side member 34 of the seatback frame 30 via a fastener 99. It is contemplated that the second end 64 of the belt member 60 is pivotally coupled to the second side member 34 of the seatback frame 30 at an approximately shoulder level location along the seatback frame 30. In this way, the belt member 60 is anchored to the seatback frame 30 at a high position. It is further contemplated that the first end 62 of the belt member 60 is also pivotally coupled to the first side member 32 of the seatback frame 30 at an approximately shoulder level location along the seatback frame 30. Thus, in the embodiment shown in FIG. 14A, the first and second ends 62, 64 of the belt member 60 are contemplated to be fixedly coupled to the seatback frame 30 in a coupling arrangement that is concealed within the interior portion 28 of the seatback 18. As shown in FIG. 14B, the coupling between the second end 64 of the belt member 60 and the seatback frame 30 is a fixed coupling that anchors the belt member 60 to the seatback frame 30 during the deployment of the airbag assembly 50 and the deployable portion 66 of the belt member 60.

Figure 15A:
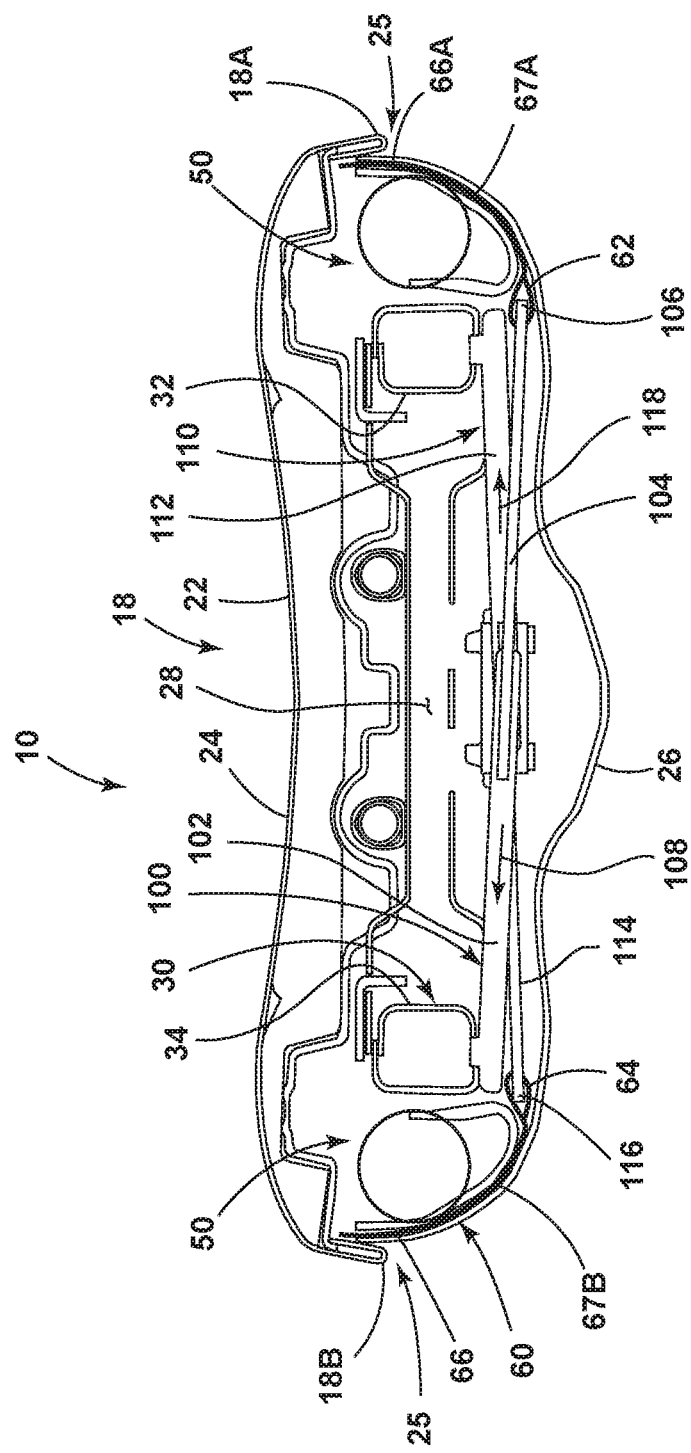
FIG. 15A is a fragmentary cross-sectional view of the seat assembly of FIG. 10 taken at line XV showing a belt member and an airbag assembly in stowed positions with dual retractor mechanisms coupled to opposed ends of the belt member.

Referring now to FIG. 15A, a retractor mechanism 100 is shown positioned within the interior portion 28 of the seatback 18. The retractor mechanism 100 is provided to retract a portion of the deployable portion 66 of the belt member 60 during or after the deployable portion 66 of the belt member 60 is deployed. The retractor mechanism 100 is contemplated to be positioned within the interior portion 28 of the seatback 18, and therefore is concealed by the front carrier module 24 and the rear carrier module 26 in assembly. The retractor mechanism 100 is contemplated to be operably coupled to the seatback frame 30 at a mounting portion 102 of the retractor mechanism 100. Specifically, the retractor mechanism 100 is shown in FIG. 15A as being operably coupled to the second side member 34 of the seatback frame 30. It is contemplated that this coupling between the retractor mechanism 100 and the second side member 34 of the seatback frame 30 is positioned at approximately a shoulder level position along the seatback 18. The retractor mechanism 100 further includes a retractable member 104 operable between extended and retracted positions relative to the mounting portion 102. In FIG. 15A, the first end 62 of the belt member 60 is operably coupled to the retractable member 104 of the retractor mechanism 100 at an engagement end 106 thereof. In this way, the retractor mechanism 100 is operably coupled between the belt member 60 and the seatback 18 at the seatback frame 30. The retractable member 104 is configured to inwardly retract along the path as indicated by arrow 108 to retract the belt member 60 by inwardly displacing the first end 62 of the belt member 60 relative to the first side 18A of the seatback 18. In this way, the retractor mechanism 100 can retract a portion of the second section 67B of the first portion 66A of the deployable portion 66 of the belt member 60 during or after the deployable portion 66 of the belt member 60 has been deployed.

As further shown in FIG. 15A, another retractor mechanism 110 is shown positioned within the interior portion 28 of the seatback 18. The retractor mechanism 110 is also provided, along with retractor mechanism 100, to retract a portion of the deployable portion 66 of the belt member 60 during or after the deployable portion 66 of the belt member 60 is deployed. The retractor mechanism 110 is contemplated to be positioned within the interior portion 28 of the seatback 18, and therefore is concealed by the front carrier module 24 and the rear carrier module 26 in assembly. The retractor mechanism 110 is contemplated to be operably coupled to the seatback frame 30 at a mounting portion 112 of the retractor mechanism 110. Specifically, the retractor mechanism 110 is shown in FIG. 15A as being operably coupled to the first side member 32 of the seatback frame 30. It is contemplated that this coupling between the retractor mechanism 110 and the first side member 32 of the seatback frame 30 is positioned at approximately a shoulder level position along the seatback 18. The retractor mechanism 110 further includes a retractable member 114 operable between extended and retracted positions relative to the mounting portion 112. In FIG. 15A, the second end 64 of the belt member 60 is operably coupled to the retractable member 114 of the retractor mechanism 110 at an engagement end 116 thereof. The retractable member 114 is configured to inwardly retract along the path as indicated by arrow 118 to retract the belt member 60 by inwardly displacing the second end 64 of the belt member 60 relative to the second side 18B of the seatback 18. In this way, the retractor mechanism 110 can retract a portion of the first section 67A of the first portion 66A of the deployable portion 66 of the belt member 60 during or after the deployable portion 66 of the belt member 60 has been deployed. In this way, the retractor mechanisms 110, 100 may be considered first and second retractor mechanisms operably coupled to the first and second ends 62, 64 of the belt member 60, respectively. The retractor mechanisms 100, 110 are contemplated to operate in a manner similar to retractor mechanism 70 disposed within the seat portion 16 of the seat assembly 10, as described above.

Figure 15B:
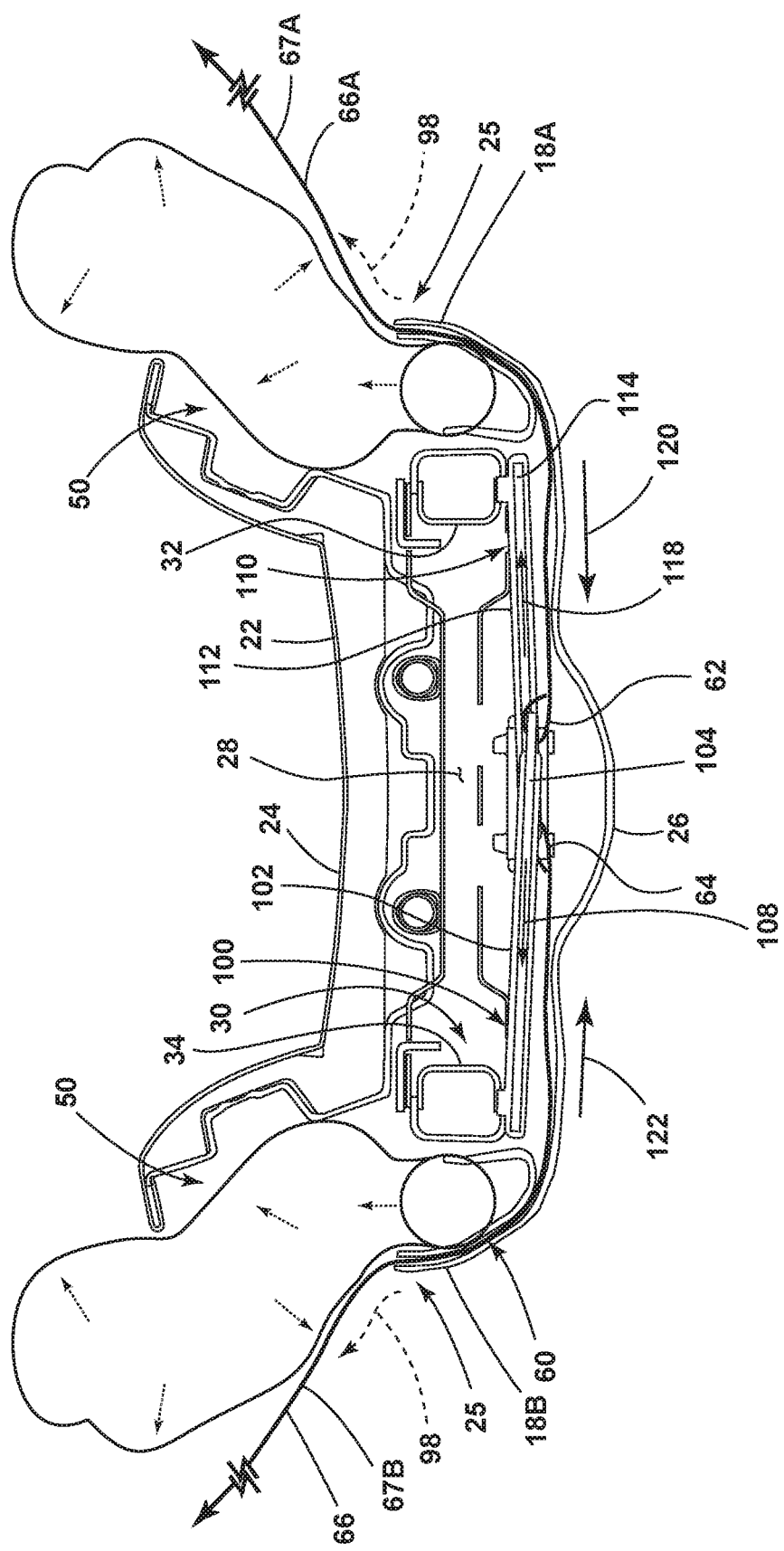
FIG. 15B is a fragmentary cross-sectional view of the seat assembly of FIG. 10 taken at line XV showing a belt member and an airbag assembly in partially deployed positions with dual retractor mechanisms retracting the belt member at opposed ends thereof.

Referring now to FIG. 15B, the airbag assembly 50 is shown having been deployed from the opposed first and second sides 18A, 18B of the seatback 18. Similarly, the first and second sections 67A, 67B of the first portion 66A of the belt member 60 are shown as being deployed from the interior portion 28 of the seatback 18. Further, the retractor mechanisms 100, 110 are shown as retracting the second end 64 and the first end 62 of the belt member 60, respectively, by inwardly retracting the respective retractable members 104, 114 to take up slack in the webbing of the belt member 60 after deployment along the path as indicated by arrows 120, 122. Thus, the belt member 60 may be retracted by simultaneously retracting the first and second ends 62, 64 thereof after deployment of the deployable portion 66 of the belt member 60. Further, it is contemplated that the retractor mechanisms 100, 110 may work in concert with the retractor mechanism 70 disposed on the seat portion 16 of the seat assembly 10 to provide a three-way retraction of the deployable portion 66 of the belt member 60 after deployment thereof.

Figure 16B:
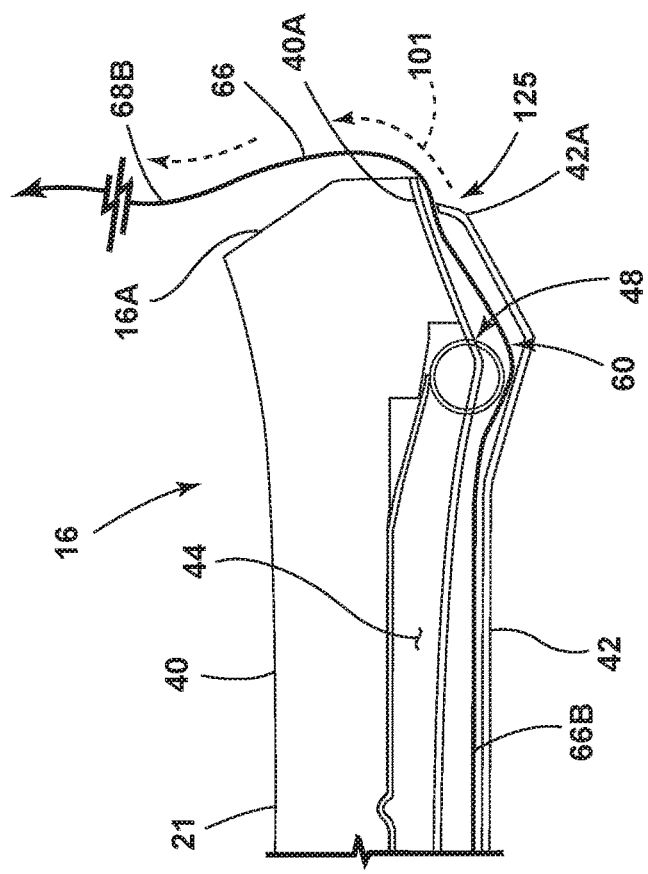
FIG. 16B is a fragmentary cross-sectional view of the seat assembly of FIG. 12 taken at line XVI showing a belt member in a partially deployed position.
Figure 16A:
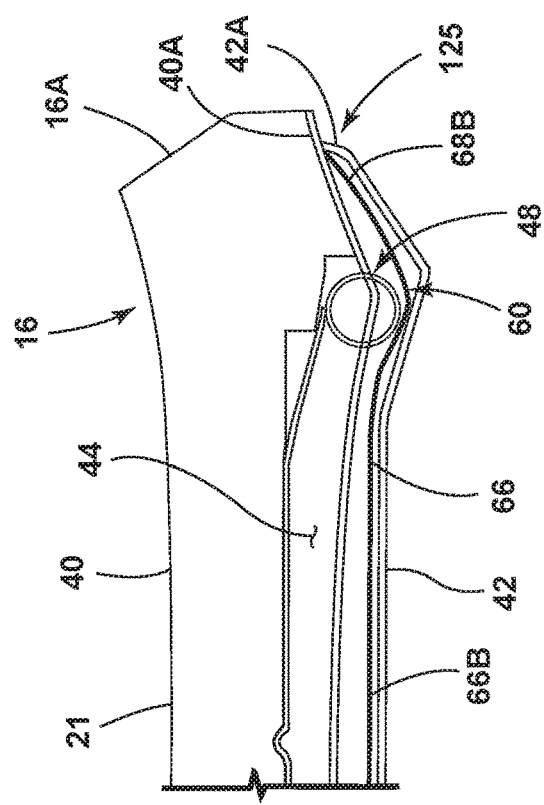
FIG. 16A is a fragmentary cross-sectional view of the seat assembly of FIG. 12 taken at line XVI showing a belt member in a stowed position.

Referring now to FIG. 16A, the second portion 66B of the deployable portion 66 of the belt member 60 is shown positioned within the interior portion 44 of the seat portion 16 in a stowed position. The seat portion 16 includes a frame member 48 disposed within the interior portion 44 of the seat portion 16. The panel 42 is shown in FIG. 16A as meeting with the upper carrier module 40 at a seam 125 disposed therebetween. Specifically, the seam 125 is positioned along the interconnection of respective edges 40A, 42A of the upper carrier module 40 and the panel 42. Referring now to FIG. 16B, the second portion 66B of the deployable portion 66 of the belt member 60 is shown deployed through the seam 125 along the path as indicated by arrow 101 to a position located outside of the interior portion 44 of the seat portion 16.

Figure 17A:
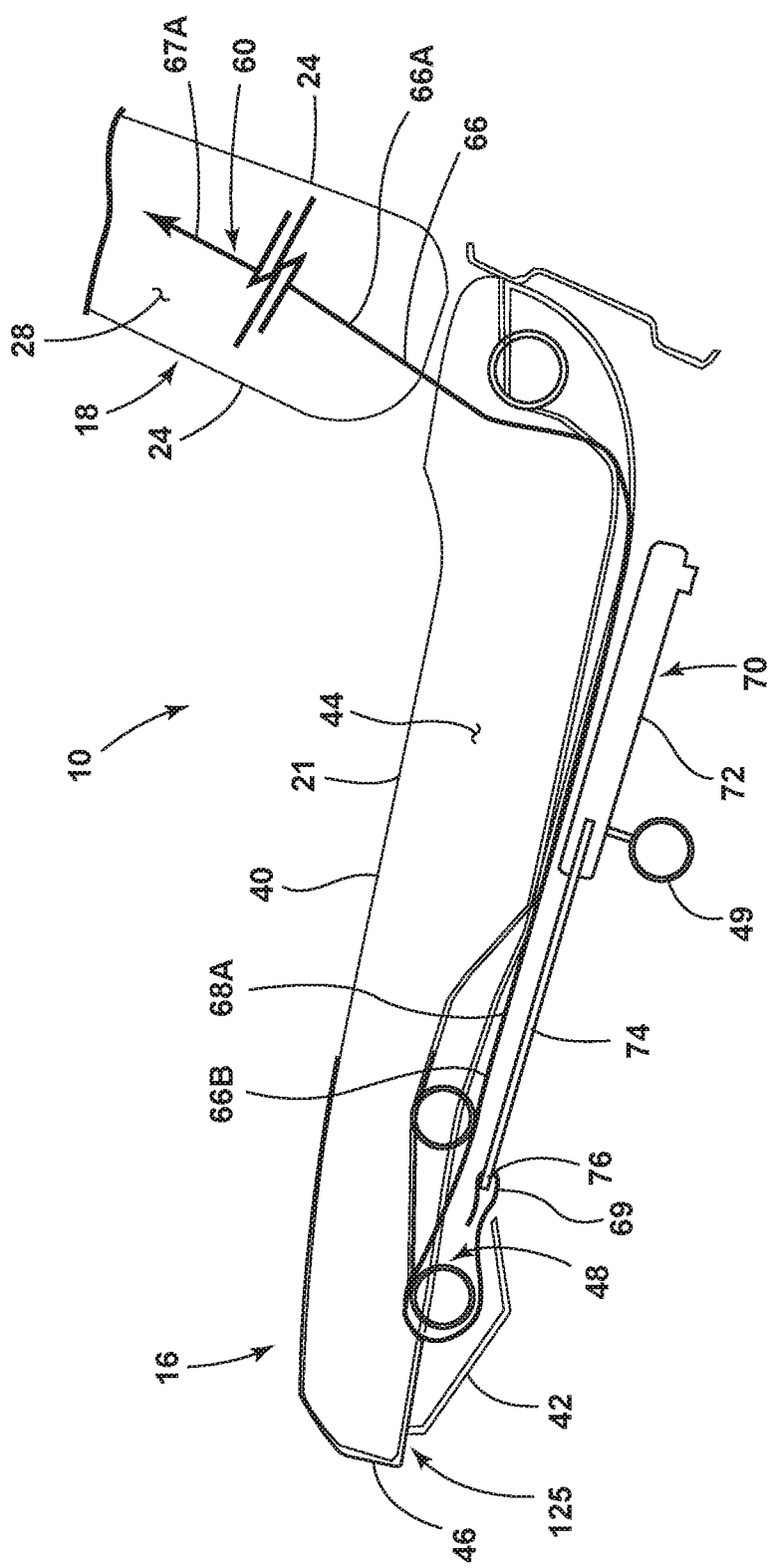
FIG. 17A is a fragmentary cross-sectional view of the seat assembly of FIG. 12 taken at line XVII showing a belt member in a stowed position in a retractor mechanism operably coupled to a seat portion.
Figure 17B:
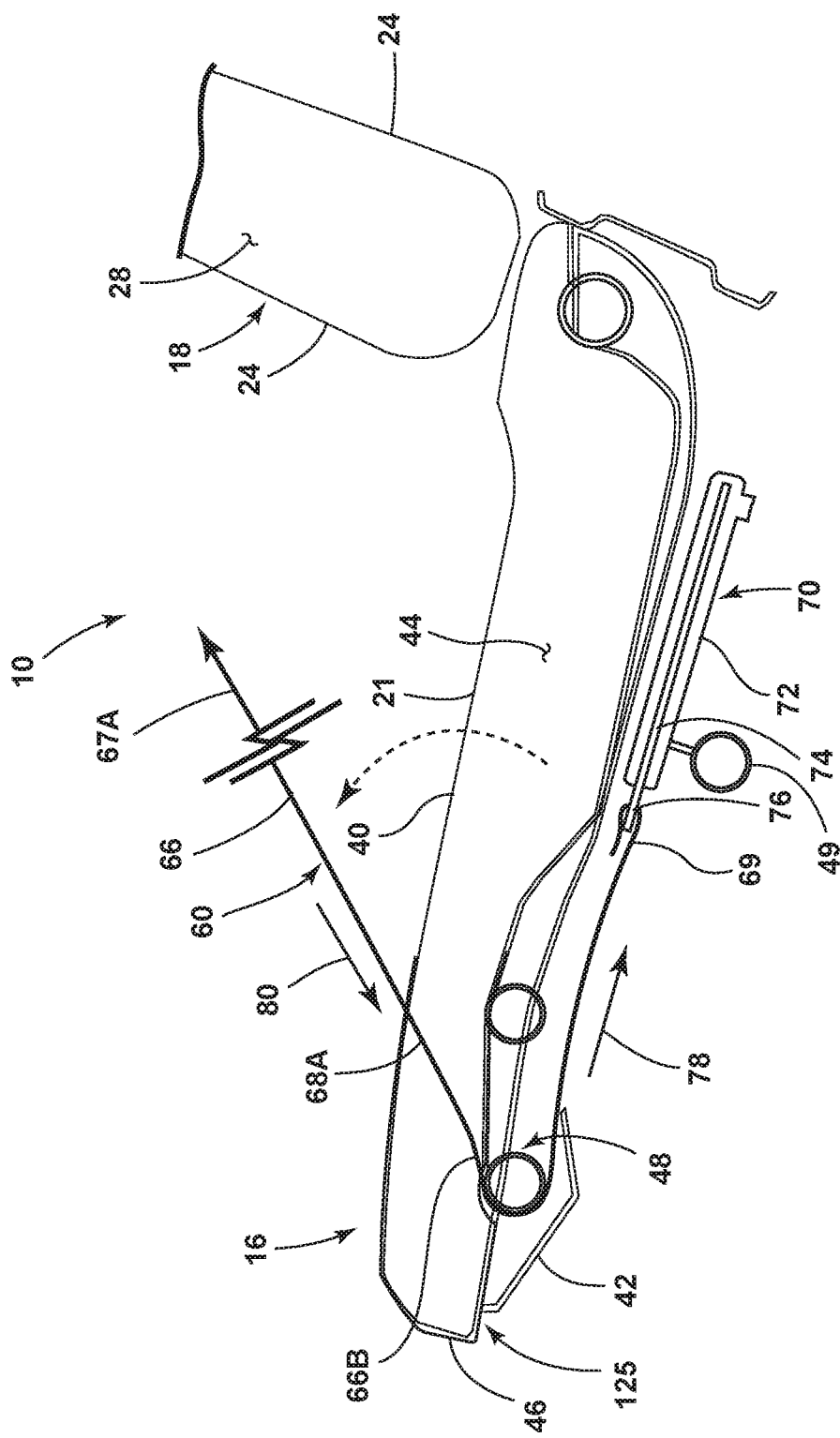
FIG. 17B is a fragmentary cross-sectional view of the seat assembly of FIG. 12 taken at line XVI showing a belt member in a partially deployed position and a retractor mechanism retracting the belt member.

Referring now to FIG. 17A, the retractor mechanism 70 is shown operably coupled to the seat portion 16 with the retractable member 74 operably coupled to the intermediate portion 69 of the belt member 60. As noted above, the belt member 60 may be anchored to the seat portion 16 in a fixed position. Such an anchored coupling is contemplated to occur between the intermediate portion 69 of the belt member 60 and the frame member 48 within the interior portion 44 of the seat portion 16 at the front portion 46 of the seat portion 16. In the embodiment shown in FIG. 17A, the coupling between the belt member 60 and the seat portion 16 is a dynamic coupling via the retractor mechanism 70. With reference to FIG. 17B, the retractable member 74 of the retractor mechanism 70 is shown as having moved inwardly along the path as indicated by arrow 78 to the retracted position to thereby retract the first section 68A of the second portion 66B of the deployable portion 66 of the belt member 60 to tighten the deployable portion 66 from a slack condition. In the embodiment shown in FIGS. 17A, 17B, the mounting portion 72 of the retractor mechanism 70 is shown operably coupled to a frame member 49 of the seat portion 16 for fixedly mounting the retractor mechanism 70 in a position where and the retractor mechanism 70 is concealed by the upper carrier module 40 of the seat portion 16.

According to one aspect of the present invention, a seat assembly includes a seatback including opposed first and second sides and an interior portion. A seat portion includes opposed first and second sides, as well as a front portion and an interior portion. A belt member includes first and second ends and a deployable portion. The deployable portion of the belt member is operable between stowed and deployed positions. The deployable portion of the belt member is disposed within the interior portion of the seatback and the interior portion of the seat portion in the stowed position. The deployable portion of the belt member is disposed outside of the interior portion of the seatback and outside of the interior portion of the seat portion in the deployed position.

Embodiments of the first aspect of the invention can include any one or a combination of the following features:
- the first and second ends are operably coupled to the opposed first and second sides of the seatback;
- a first portion of the deployable portion of the belt member is disposed along the opposed first and second sides of the seatback within the interior portion of the seatback when the belt member is in the stowed position;
- the belt member includes an intermediate portion disposed between the first and second ends, and further wherein the intermediate portion is operably coupled to the front portion of the seat portion;
- a second portion of the deployable portion of the belt member is disposed along the opposed first and second sides of the seat portion within the interior portion of the seat portion when the belt member is in the stowed position; and
- a retractor mechanism disposed on one of the seatback and the seat portion, wherein the retractor mechanism is operably coupled to the belt member and operative to retract a portion of the deployable portion of the belt member.

According to another aspect of the present invention, a seat assembly includes a seatback including an interior portion. A seatback frame is disposed within the interior portion of the seatback. A seat portion includes an interior portion. A belt member includes first and second ends and a deployable portion. The deployable portion of the belt member includes first and second portions and is operable between stowed and deployed positions. The first portion of the deployable portion is disposed within the interior portion of the seatback when the deployable portion is in the stowed position. The second portion of the deployable portion is disposed within the interior portion of the seat portion when the deployable portion is in the stowed position. The first and second portions of the deployable portion of the belt member are disposed outside of the interior portion of the seatback and outside of the interior portion of the seat portion when the deployable portion is in the deployed position.

Embodiments of the second aspect of the invention can include any one or a combination of the following features:
- the first and second ends of the belt member are operably coupled to opposed first and second side members of the seatback frame, respectively;
- wherein the belt member includes an intermediate portion operably coupled to a front portion of the seat portion;
- the front portion of the seat portion includes a displaceable platform pivotable between first and second positions, wherein the second position is an upwardly angled position relative to the first position;
- a retractor mechanism operably coupled to the seat portion and having a retractable member operable between extended and retracted positions, wherein an intermediate portion of the belt member is operably coupled to the retractable member to retract the belt member by inwardly displacing the intermediate portion of the belt member relative to a front portion of the seat portion;
- a retractor mechanism operably coupled to the seatback frame and one of the first and second ends of the belt member and operative to retract a portion of the deployable portion of the belt member into the interior portion of the seatback;
- a first retractor mechanism operably coupled to the first side member of the seatback frame and the first end of the belt member, the first retractor mechanism operative to retract a portion of the deployable portion of the belt member; and
- a second retractor mechanism operably coupled to the second side member of the seatback frame and the second end of the belt member, the second retractor mechanism operative to retract a portion of the deployable portion of the belt member.

According to yet another aspect of the present invention, a seat assembly includes a seatback including an interior portion. A seat portion includes an interior portion and a front portion. A belt member includes first and second ends and a deployable portion disposed therebetween. The deployable portion is operable between a stowed position and a deployed position. The deployable portion is disposed within the interior portion of the seatback and the interior portion of the seat portion when the deployable portion is in the stowed position. The deployable portion of the belt member is disposed outside of the interior portion of the seatback and outside of the interior portion of the seat portion when the deployable portion is in the deployed position. A retractor mechanism is operably coupled to the belt member and operative to retract a portion of the deployable portion of the belt member.

Embodiments of the third aspect of the invention can include any one or a combination of the following features:
- the first and second ends of the belt member are anchored to opposed sides of the seatback within the interior portion of the seatback;
- the belt member includes an intermediate portion anchored to the front portion of the seat portion;
- the retractor mechanism is operably coupled to the seat portion and the belt member;
- the retractor mechanism is disposed within the interior portion of the seatback and operably coupled between the seatback and one of the first and second ends of the belt member; and
- the deployable portion of the belt member includes a first length when the deployable portion of the belt member is in the stowed position, and further wherein the deployable portion of the belt member includes a second length that is less than the first length when the deployable portion of the belt member is in the deployed position and a retracted condition.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
a seatback having opposed first and second sides and an interior portion;
a seat portion having opposed first and second sides, a front portion and an interior portion; and
a belt member having first and second ends and a deployable portion, wherein the first and second ends are operably coupled to the opposed first and second sides of the seatback, and further wherein the deployable portion of the belt member is operable between a stowed position, wherein the deployable portion of the belt member is disposed within the interior portion of the seatback and the interior portion of the seat portion, and further wherein a first portion of the deployable portion of the belt member is disposed along the opposed first and second sides of the seatback within the interior portion of the seatback when the belt member is in the stowed position, and a deployed position, wherein the deployable portion of the belt member is disposed outside of the interior portion of the seatback and outside of the interior portion of the seat portion.

2. The seat assembly of claim 1, wherein the belt member includes an intermediate portion disposed between the first and second ends, and further wherein the intermediate portion is operably coupled to the front portion of the seat portion.

3. The seat assembly of claim 2, wherein a second portion of the deployable portion of the belt member is disposed along the opposed first and second sides of the seat portion within the interior portion of the seat portion when the belt member is in the stowed position.

4. The seat assembly of claim 1, including:
a retractor mechanism disposed on one of the seatback and the seat portion, wherein the retractor mechanism is operably coupled to the belt member and operative to retract a portion of the deployable portion of the belt member.

5. A seat assembly, comprising:
a seatback having an interior portion;
a seatback frame disposed within the interior portion of the seatback;
a seat portion having an interior portion;
a belt member having first and second ends and a deployable portion, wherein the first and second ends of the belt member are operably coupled to opposed first and second side members of the seatback frame, respectively, and further wherein the deployable portion of the belt member includes first and second portions and is operable between a stowed position, wherein the first portion of the deployable portion is disposed within the interior portion of the seatback and the second portion of the deployable portion is disposed within the interior portion of the seat portion, and a deployed position, wherein the first and second portions of the deployable portion are disposed outside of the interior portion of the seatback and outside of the interior portion of the seat portion, respectively;
a first retractor mechanism operably coupled to the first side member of the seatback frame and the first end of the belt member, the first retractor mechanism operative to retract a portion of the deployable portion of the belt member; and
a second retractor mechanism operably coupled to the second side member of the seatback frame and the second end of the belt member, the second retractor mechanism operative to retract a portion of the deployable portion of the belt member.

6. The seat assembly of claim 5, wherein the belt member includes an intermediate portion operably coupled to a front portion of the seat portion.

7. The seat assembly of claim 6, wherein the front portion of the seat portion includes a displaceable platform pivotable between first and second positions, wherein the second position is an upwardly angled position relative to the first position.

8. The seat assembly of claim 5, including:
a third retractor mechanism operably coupled to the seat portion and having a retractable member operable between extended and retracted positions, wherein an intermediate portion of the belt member is operably coupled to the retractable member to retract the belt member by inwardly displacing the intermediate portion of the belt member relative to a front portion of the seat portion.

9. A seat assembly, comprising:
a seatback having an interior portion;
a seat portion having an interior portion and a front portion;
a belt member having first and second ends and a deployable portion disposed therebetween, wherein the deployable portion is operable between a stowed position, wherein the deployable portion is disposed within the interior portion of the seatback and the interior portion of the seat portion, and a deployed position, wherein the deployable portion is disposed outside of the interior portion of the seatback and outside of the interior portion of the seat portion; and
a retractor mechanism operably coupled to the belt member and operative to retract a portion of the deployable portion of the belt member, wherein the deployable portion of the belt member includes a first length when the deployable portion of the belt member is in the stowed position, and further wherein the deployable portion of the belt member includes a second length that is less than the first length when the deployable portion of the belt member is in the deployed position and a retracted condition.

10. The seat assembly of claim 9, wherein the first and second ends of the belt member are anchored to opposed sides of the seatback within the interior portion of the seatback.

11. The seat assembly of claim 9, wherein the belt member includes an intermediate portion anchored to the front portion of the seat portion.

12. The seat assembly of claim 9, wherein the retractor mechanism is operably coupled to the seat portion and the belt member.

13. The seat assembly of claim 9, wherein the retractor mechanism is disposed within the interior portion of the seatback and operably coupled between the seatback and one of the first and second ends of the belt member.

* * * * *